United States Patent
Lebas et al.

(10) Patent No.: US 8,474,751 B2
(45) Date of Patent: Jul. 2, 2013

(54) DEVICE FOR FASTENING A TURBOPROP, PREFERABLY UNDER AN AIRCRAFT WING

(75) Inventors: Guillaume Lebas, Toulouse (FR); Jerome Cassagne, Toulouse (FR); Yvon Martin, Bonrepos Riquet (FR)

(73) Assignee: AIRBUS Operations S.A.S., Toulouse (FR)

( * ) Notice: Subject to any disclaimer, the term of this patent is extended or adjusted under 35 U.S.C. 154(b) by 318 days.

(21) Appl. No.: 13/004,369

(22) Filed: Jan. 11, 2011

(65) Prior Publication Data
US 2011/0174918 A1 Jul. 21, 2011

(30) Foreign Application Priority Data

Jan. 15, 2010 (FR) ...................................... 10 50265

(51) Int. Cl.
 *B64B 1/24* (2006.01)
(52) U.S. Cl.
 USPC ............................................................ 244/54
(58) Field of Classification Search
 USPC .................. 244/54, 53 R; 248/554, 555, 556, 248/557; 60/796, 797
 See application file for complete search history.

(56) References Cited

U.S. PATENT DOCUMENTS

| | | | |
|---|---|---|---|
| 2,145,280 A | 1/1939 | Stitz | |
| 4,875,655 A * | 10/1989 | Bender et al. | 248/557 |
| 5,918,833 A | 7/1999 | Najand et al. | |
| 6,123,293 A * | 9/2000 | Breitbach et al. | 244/54 |
| 7,296,768 B2 * | 11/2007 | Machado et al. | 244/54 |
| 8,226,028 B2 * | 7/2012 | Marche | 244/54 |
| 2010/0181418 A1 * | 7/2010 | Vauchel et al. | 244/54 |

FOREIGN PATENT DOCUMENTS

| | | |
|---|---|---|
| EP | 0 855 536 A1 | 7/1998 |
| EP | 0 869 062 A2 | 10/1998 |
| EP | 0 869 062 A3 | 10/1998 |
| GB | 798832 | 7/1958 |

OTHER PUBLICATIONS

French Search Report issued Sep. 13, 2010 in FR 1050265.

* cited by examiner

*Primary Examiner* — Tien Dinh
*Assistant Examiner* — Keith L Dixon
(74) *Attorney, Agent, or Firm* — Oblon, Spivak, McClelland, Maier & Neustadt, L.L.P.

(57) ABSTRACT

The present invention relates to an engine assembly for an aircraft comprising an attachment means, a turboprop on an attachment mast, this means including a plurality of front engine attachments (16) each having an engine vibration insulation system (20) including a housing (22), a stress transmitting member (24) extending along a first axis (26) parallel to an axis of rotation of the propeller and a hollow member (28) integrated in the housing and extending along a second axis (30) orthogonal to and intersecting the first axis. According to the invention, a support means for supporting the system (20) is formed by a plurality of clevises (32a, 32b) each having a middle plane parallel to its clevis heads, integrating one of the first and second axes and orthogonal to the other of said axes.

9 Claims, 10 Drawing Sheets

DEVICE FOR FASTENING A TURBOPROP, PREFERABLY UNDER AN AIRCRAFT WING

The present invention generally relates to an engine assembly for an aircraft comprising a turboprop, an attachment mast, and a means for attaching the turboprop on the attaching mast.

Traditionally, the attaching means comprises a plurality of front engine attachments inserted between the attachment mast and a casing of the turboprop transmission. Each front engine attachment comprises an engine vibration insulation system (EVIS), a means for supporting said system integrated into the transmission, as well as a fastening means inserted between the support means and the vibration insulation system. The latter part is usually provided to ensure the pickup of stresses in the direction of its stress transmitting member oriented longitudinally, but also in the transverse and vertical directions. In other words, the engine vibration insulation system is provided to ensure picking up of stresses in three directions orthogonal to each other, one of which is supported by that system's stress transmitting member.

Additionally, in the existing embodiments, the support means assumes the form of a platen provided with tapped holes, while the fastening means is made up of elements screwed in the tapped holes, passing through a housing of the stress transmitting device in order to ensure the fastening thereof on the platen of the transmission.

While this design of the front engine attachments is suitable for medium-power turboprops, it is unsuitable for use with extremely high-power turboprops relative to those encountered to date, for example with powers greater than 10,000 horsepower, e.g. in the vicinity of 13,000 horsepower, or even more.

Indeed, with such powers, the engine torque can rise above 230,000 N.m. To ensure picking up of that torque, the support platens provided of the casing of the transmission must be overdimensioned, and the number of screwed elements multiplied, with the shared result of a significant increase in the overall mass of the front engine attachment, combined with space and environment allocation issues.

Moreover, the contact interface between the platen and the housing of the vibration insulation system can be the location of significant friction. To prevent premature wear of the contact surfaces making up the interface, it may be necessary to apply protective coatings on those surfaces. These anti-wear coatings are of course penalizing in terms of mass and cost.

Moreover, the screwed elements used do not make it possible to clearly identify the stress paths between the casing of the transmission and the vibration insulation system. Moreover, the latter part being in direct contact with the platen, it undergoes significant heat conduction coming from the transmission, which can lead to an alteration of the elastomer provided in said device, and/or a reduction of its lifetime.

Lastly, it is specified that other drawbacks associated with the current solution lie in the difficulty of repairing the front attachment in case of failure, and the difficulty said part encounters in bearing the differential expansion.

The invention therefore aims to at least partially resolve the aforementioned drawbacks, relative to the embodiments of the prior art.

To that end, the invention relates to an engine assembly for an aircraft comprising:
a turboprop provided with a propeller and a transmission driving a rotor of said propeller;
an attachment mast of the turboprop;
an attachment means for attaching the turboprop on said attachment mast, said means comprising a plurality of front engine attachments inserted between said attachment mast and a casing of the turboprop transmission, each front engine attachment comprising an engine vibration insulation system, a support means thereof integrated into the casing of the transmission, as well as a fastening means inserted between said support means and the vibration insulation system, the latter part including:
a housing mounted on the support means via a fastening means;
a stress transmitting member extending along a first axis parallel to a rotational axis of said propeller, said member comprising an outer end mounted on said attachment mast; and
a hollow member integrated in said housing and extending along a second axis orthogonal to and intersecting said first axis, said hollow member housing an inner end of the stress transmitting member.

According to the invention, for each front attachment, said support means is formed by a plurality of clevises each having a middle plane parallel to its clevis head, integrating one of said first and second axes and orthogonal to the other of said axes.

The invention is remarkable in that the front engine attachments have a design capable of bearing extremely high stress levels, while also having a reasonable overall mass. Moreover, with the particular orientation of the clevises, the stresses moving towards the vibration insulation system are perfectly oriented to enable to latter part to ensure picking up of the stresses in three directions orthogonal to each other, one of which is borne by the stress transmitting member of said system. Moreover, the clevis solution makes it possible to clearly identify the stress paths between the casing of the transmission and the stress transmitting device.

The friction is significantly reduced relative to the support platen solution of the prior art, since the housing of the engine vibration insulation system is preferably not in contact with the casing of the transmission, i.e. away therefrom. In this respect, the separation of the engine vibration insulation system makes it less thermally exposed to the heat released by the transmission, such that the risks of deterioration of the elastomer are decreased, and its lifetime increases.

Lastly, it is specified that other advantages of the invention lie in the ease of repair of the front engine attachments in case of failure, and in the ability thereof to bear the differential expansion as well as any mechanical deformations.

Preferably, said plurality of clevises includes:
a first clevis arranged in front relative to said housing of the engine vibration insulation system, said first clevis having a middle plane parallel to its clevis heads, integrating said first axis and orthogonal to the second; and
two second clevises arranged respectively on either side of said housing of the engine vibration insulation system, along said second axis, the two second clevises having a same middle plane parallel to their clevis heads, integrating said second axis and orthogonal to the first.

Preferably, said fastening means includes a fork connecting said first clevis to the housing of the engine vibration insulation system, said fork extending in a plane integrating said second axis. This orientation of the fork procures a very healthy introduction of the thrust stresses into the engine vibration insulation system.

Preferably, said first clevis extends from a front fastening clip of the transmission casing, said front fastening clip being fixedly mounted on a rear fastening clip of a stator of said propeller. This procures picking up of the thrust stresses closest to the front antifriction bearing inserted between the propeller shaft and the propeller stator, bearing through which the stresses generated by the propeller pass. Bringing the front engine attachments closer to the antifriction bearing considerably decreases the appearance of harmful induced stresses.

Preferably, said fastening means connected with at least one of said two second clevises includes a hinge member passing through it, said hinge member being parallel to the first axis and also passing through a fitting housed in the clevis, formed in a single piece with the housing.

Preferably, said fastening means connected with at least one of said two second clevises comprises a hinge member passing through it, a fitting housed in the first clevis, also passed through by said hinge member parallel to the first axis, and another hinge member parallel to the first axis, passing through the fitting and clevis provided in a single piece with the housing, in which said fitting is housed.

In this scenario, said fitting is preferably triangular or in the form of a connecting rod.

Preferably, said plurality of clevises also includes a third clevis arranged between the two second clevises, and in that said fastening means connected with said third clevis includes a hinge member passing through it, a connecting rod parallel to the second axis housed in the third clevis, also passed through by said hinge member parallel to the first axis, and another hinge member parallel to the first axis, passing through the connecting rod and a clevis provided in a single piece with the housing, in which said connecting rod is housed.

Preferably, each front attachment is designed such that the picking up of stresses by said plurality of clevises is done with only six degrees of freedom, in order to preserve an isostatic system.

Other advantages and features of the invention will appear in the non-limiting detailed description below.

This description will be done in light of the appended drawings, in which:

FIG. 1 shows a perspective view, partially exploded, of an engine assembly for an aircraft according to a first preferred embodiment of the present invention;

FIG. 2 diagrammatically illustrates the location of the front engine attachments used in the engine assembly of the preceding figure;

Figure 1:
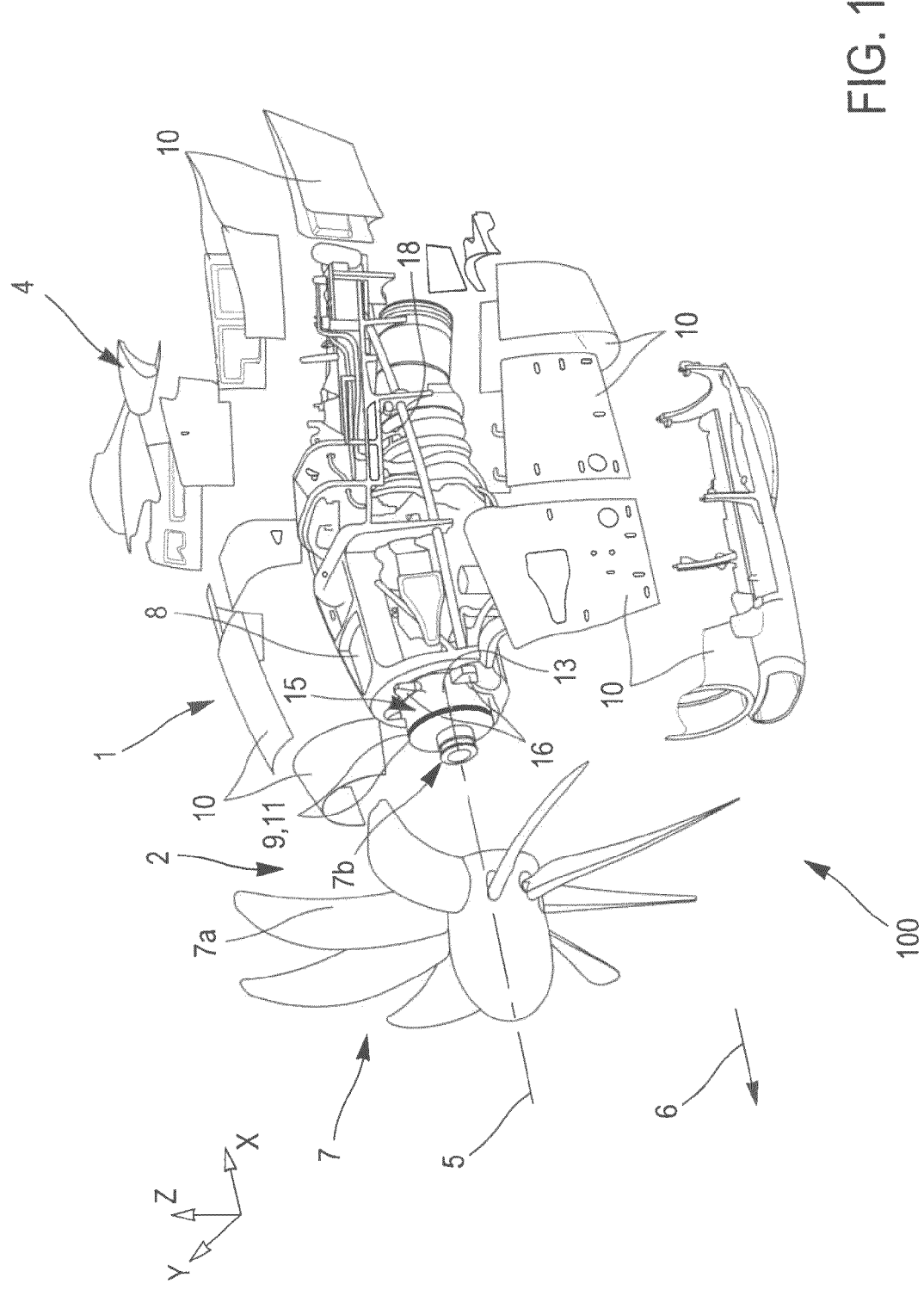
FIG. 1 shows an engine assembly 100 for an aircraft, according to one preferred embodiment of the present invention.

This assembly 100 is intended to be arranged under an aircraft wing, which is only partially shown for obvious clarity reasons, and generally designated by numerical reference 4. It comprises a turboprop 2, as well as an attachment device or mast 1, and a means for attaching the turboprop on the primary structure of the mast, also called rigid structure.

In all of the following description, following convention, X will refer to the longitudinal direction parallel to an axis of rotation 5 of the propeller 7 of the turboprop 2, Y will refer to the direction oriented transversely, and Z to the vertical direction or the radially oriented direction of the turboprop 2 towards the attachment device 1, these three directions being orthogonal to each other. Additionally, the terms "front" and "rear" are used relative to a direction of forward motion of the aircraft encountered following the thrust exerted by the turboprops 2, this direction being shown diagrammatically by arrow 6.

In FIG. 1, the propulsive propeller 7 comprises a rotor portion 7a integrating the blades, centered on the axis 5, as well as a stator portion 7b also centered on the axis 5. The stator portion includes a rear fastening clip 9 mounted by bolting on a front fastening clip 11 of a casing 13 of a transmission 15 of the turboprop. This transmission 15, situated at the rear of the propeller 7 it drives, therefore includes a substantially annular casing 13, centered on the axis 5.

The attachment mast 1 includes a rigid primary structure 8, intended to form the structural portion of the mast, through which the engine stresses pass. So-called secondary structures 10 ensure the segregation and maintenance of the systems while bearing aerodynamic fairings.

The attachment means inserted between the rigid structure 8 and the turboprop 2 are made up here of front engine attachments 16, and rear engine attachments 18. The latter parts are inserted between a gas exhaust casing of the turboprop and a lower rear portion of the rigid structure 8, while the front engine attachments are arranged between a front end of the rigid structure 8 and the transmission 15 casing 13. Preferably, there are two rear engine attachments, each capable of ensuring the picking up of stresses along two degrees of freedom, preferably in directions Y and Z, while there are four front engine attachments, each capable of ensuring picking up of stresses along three degrees of freedom, i.e. in directions X, Y and Z.

Figure 2:
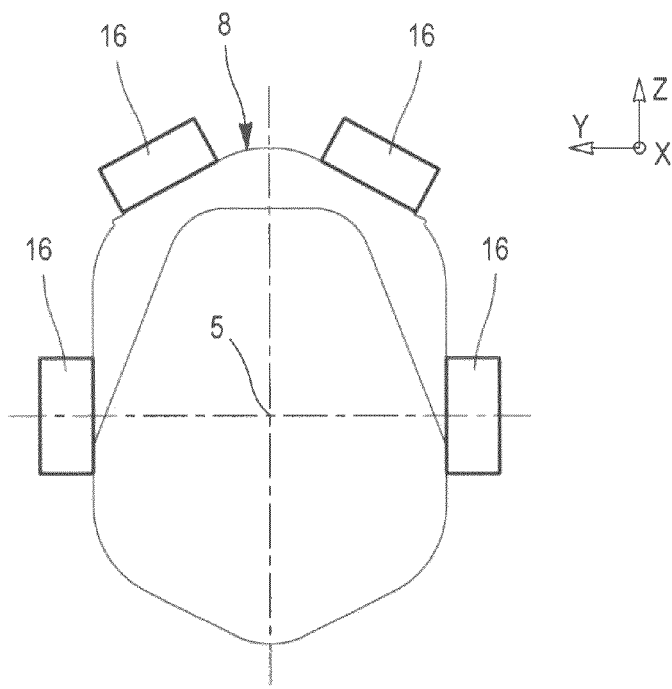
Figure 3:
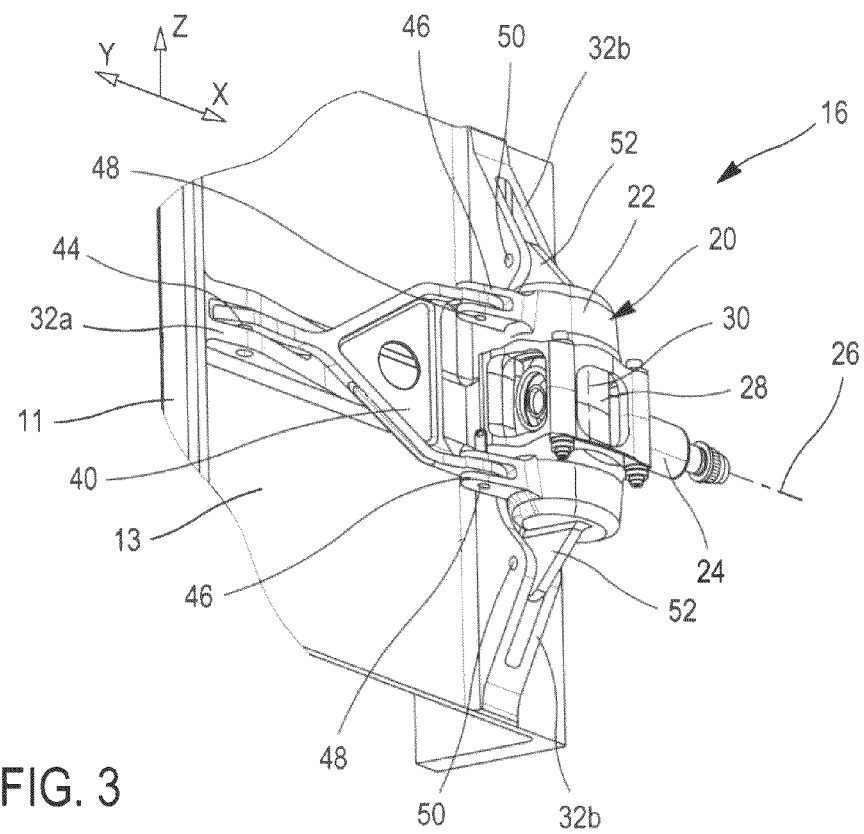
FIGS. 3 to 8 show an embodiment of a front engine attachment.

As shown in FIG. 2, the four front engine attachments 16 are arranged symmetrically relative to a middle plane XZ, with two upper attachments and two side attachments each passed through by a middle plane XY.

The design of these attachments 16 being substantially identical, only one of the two side attachments will be described in detail below. In this respect, it should therefore be understood that the other front engine attachments differ from that which will be presented below only by their orientations in reference X, Y, Z.

In reference first to FIGS. 3 to 8, a first embodiment is shown for the side front engine attachment 16 arranged on the right in FIG. 2.

Figure 5:
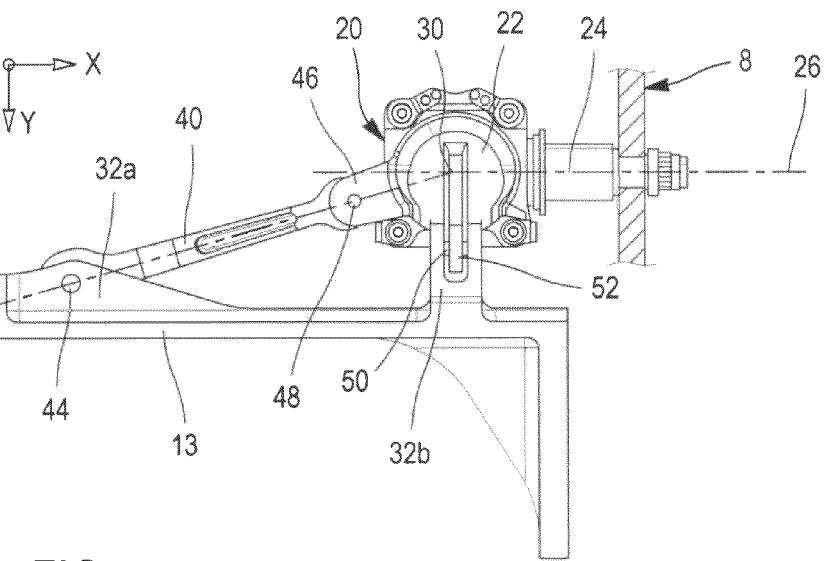
Figure 6:
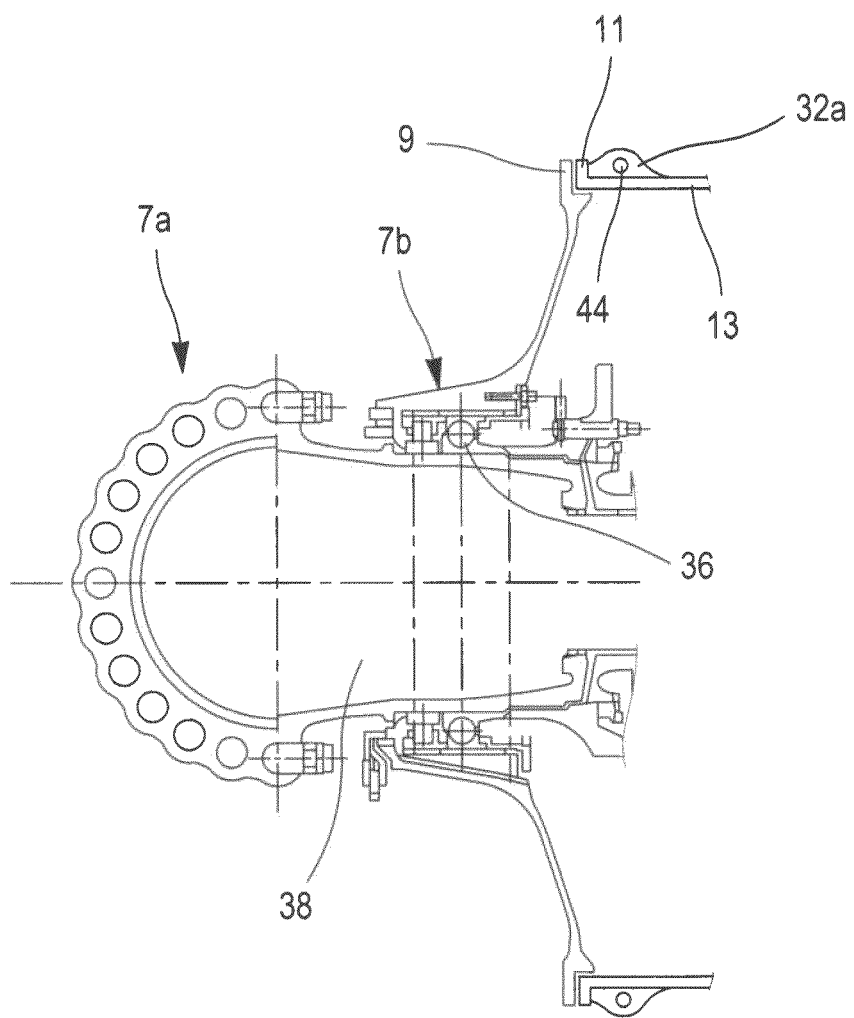
Figure 18:
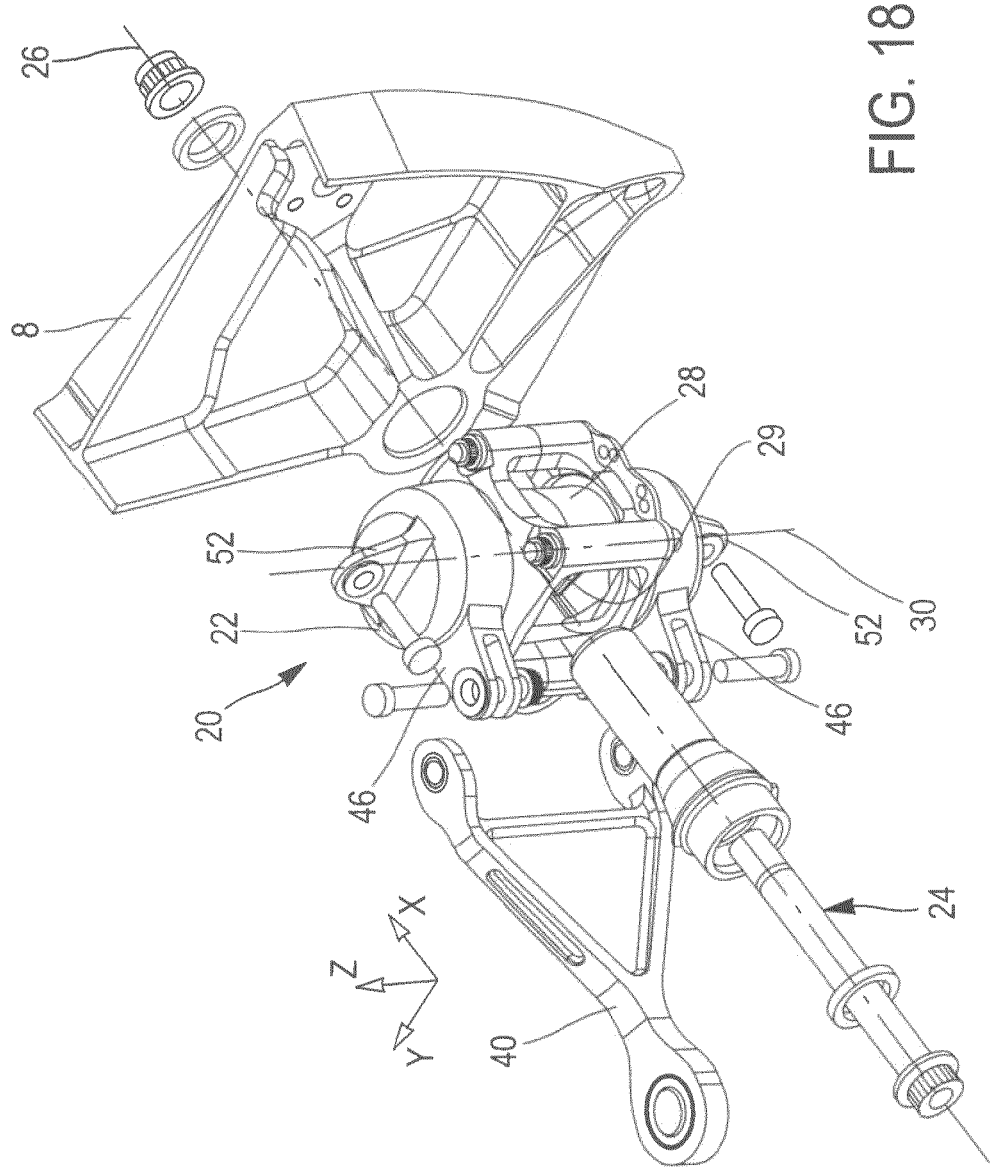
FIG. 18 shows an exploded perspective view of the engine vibration insulation system used in the engine attachments of the preceding figures.

The attachment 16 comprises an engine vibration insulation system (EVIS) 20, shown in an exploded view in FIG. 18. Overall, this device 20 known in itself integrates a housing 22 forming an outer casing, and a stress transmitting member 24 in the form of an axle or shaft extending along a first axis 26 parallel to the axis of rotation 5, and therefore parallel to direction X. This member 24 has an outer end mounted on the primary structure 8, as shown in FIG. 5. It is also through this member 24 that the stresses exerted in all three directions X, Y and Z are transmitted to the primary structure 8. Moreover, the device 20 includes a hollow member 28 integrated into the housing 22 and extending along a second axis 30 orthogonal to and intersecting the first axis 26, i.e. oriented in direction Z. This hollow member 28, which can be fastened in the housing or made in a single piece therewith, preferably assumes a cylindrical shape with axis 30, and houses an inner end of the stress transmitting member 24. To that end, it includes a through orifice 29 oriented along the axis 26, which gives the member 28 its hollow nature. Moreover, the vibration insulation system 20 comprises, traditionally and as known by those skilled in the art, a means making it possible to damp the vibrations, such as elastomer elements.

The engine attachment 16 is completed by a support means for supporting the engine vibration insulation system 20, as well as a fastening means inserted between said support means and the device 20.

In the first example, the support means, which makes it possible to keep the housing 22 away from the casing 13 of the transmission 15, is formed by a plurality of clevises integrated in the casing 13, protruding radially therefrom towards the outside. In this respect, these clevises are made in a single piece with the casing, or fixedly fastened thereon, for example by welding.

Figure 4:
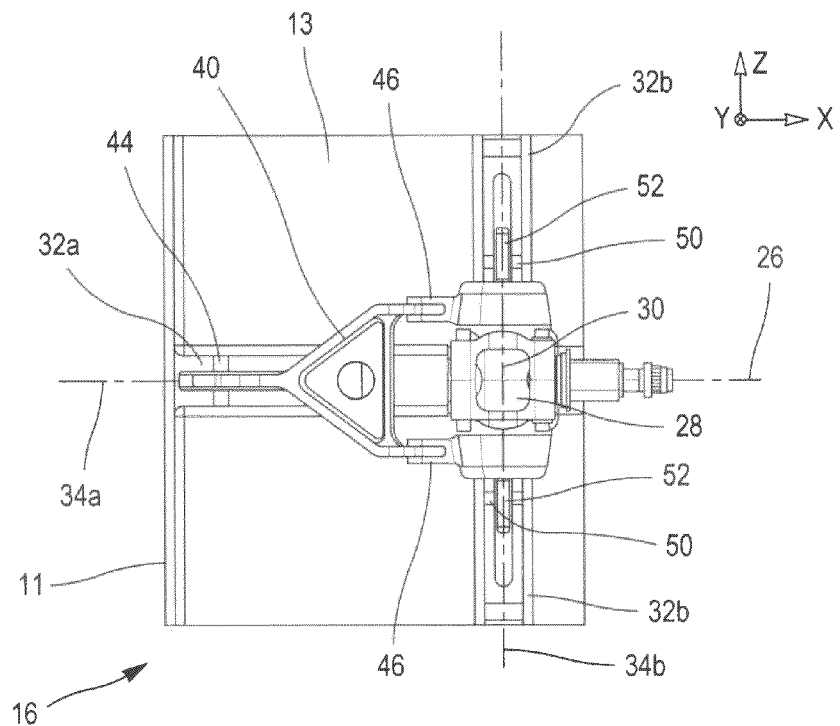

The plurality of clevises includes a first clevis 32a arranged in front relative to the housing 22, said first clevis having a middle plane parallel to its clevis heads, referenced 34a, integrating the first axis 26 and orthogonal to the second axis 30 as better visible in FIG. 4. This first clevis 32a has the particularity of extending from the front fastening clip 11 of the casing 13 of the transmission, which makes it possible to pick up the thrust stresses very close to the front antifriction bearing 36 inserted between the propeller shaft 38 and the propeller stator 7b shown in FIG. 6, bearing through which the stresses generated by said propeller pass.

Two second clevises 32b are also provided arranged on either side of the housing 22, respectively, along the second axis 30, the two second clevises 32b having a same middle plane parallel to their clevis heads, referenced 34b, integrating the second axis 30 and orthogonal to the first axis 26 as better visible in FIG. 4.

In this first example, the support means is therefore made up of three clevises 32a, 32b, 32b, the first oriented along plane XY, and the second ones oriented along a same plane YZ.

To ensure the mounting of the device 20 on said clevises, the fastening means first comprises, connected with the first clevis 32a, a fork 40 connecting it to the housing 20. This form 40 extends in a plane 42 integrating the second axis 30, as visible in FIG. 5. In other words, its base and its two arms are arranged in this same plane 42, with the base housed in the first clevis 32a and hinged thereon via a suitable member 44 oriented in the direction Z, and with each of the two arms being housed in an associated clevis 46 provided in a single piece with the housing, and hinged thereon via a suitable member 48 also oriented along the direction Z.

The fastening means also comprises, combined with each of the two second clevises 32b, a hinge member 50 passing through it, said member being parallel to the first axis 26 and also passing through a fitting 52 housed in the clevis 32b, provided in a single piece with the housing 22. The member 50 in axis form therefore makes it possible to hinge the fitting 52 on the clevis 32b, in direction X. The two fittings 52 are spaced apart from each other along the direction of the axis 30 and are situated on either side of the hollow member 28.

Figure 7:
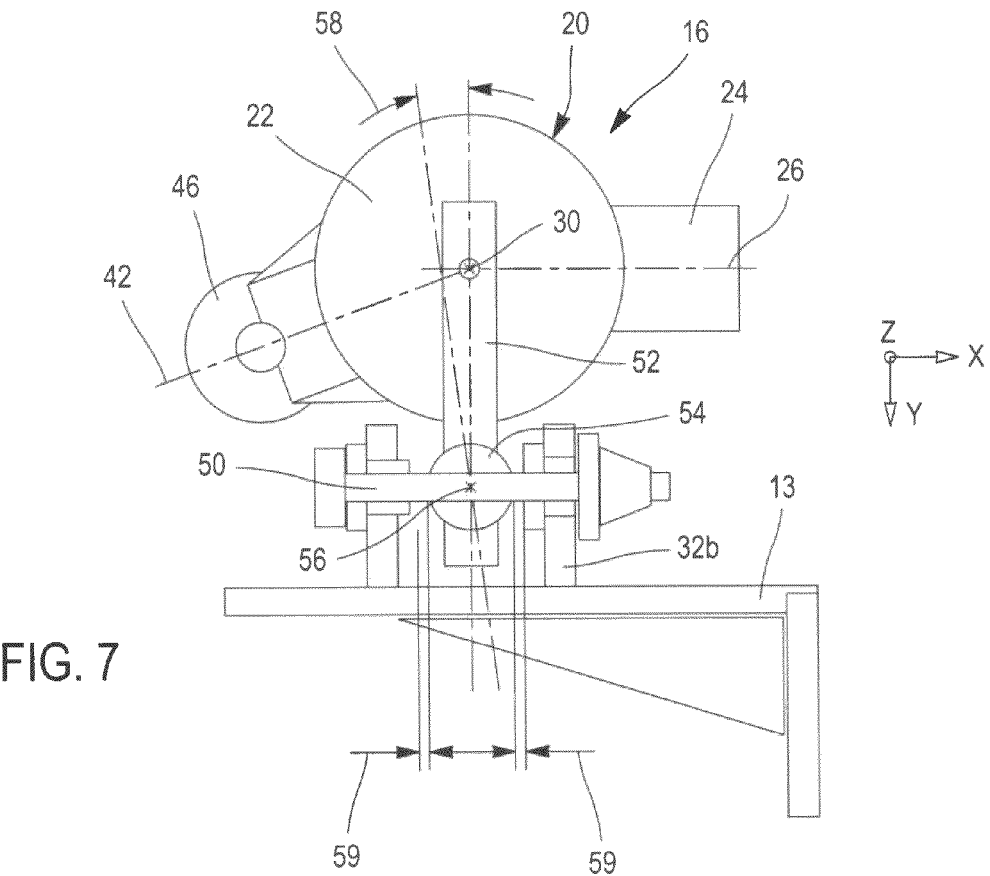

In reference to FIG. 7, the member 50 can be provided equipped with a ball joint 54 in order to form a swivel axis. The fitting 52 is in this case mounted on the ball joint 54 so as to be able to pivot following a limited amplitude 58, along a first axis 56 oriented in direction Z and going through the center of the ball joint 54, in particular to face the differential expansion. It is also provided that the ball joint 54 can slide in a limited manner in direction X on its axis 50, for example by providing suitable play 59 between the ball joint and the clevis heads. This makes it possible to filter the stresses in direction X, and to pick up only the stresses oriented along directions Y and Z with each of the two second clevises 32b. A similar design can be associated with the first clevis 32a, thereby making it possible to filter the stresses along direction Z, and to pick up only stresses oriented in directions X and Y with said first clevis 32b.

Figure 8:
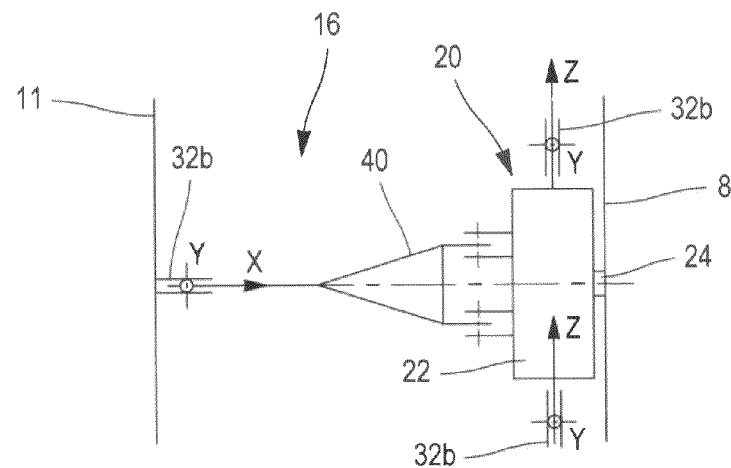
Figure 9:
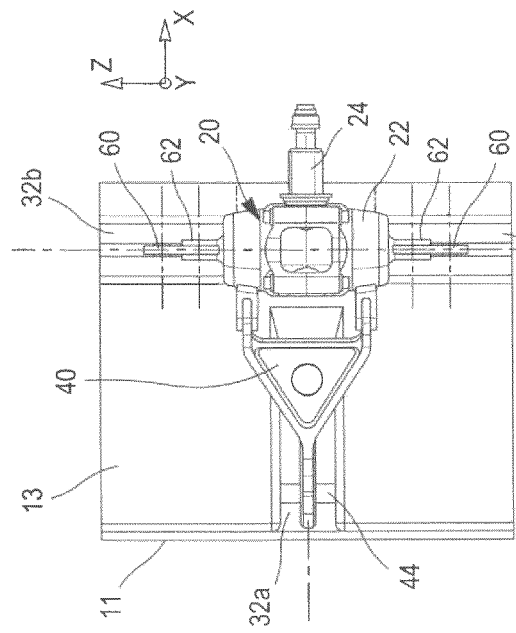
FIGS. 9 to 12 show another embodiment of a front engine attachment.
Figure 10:
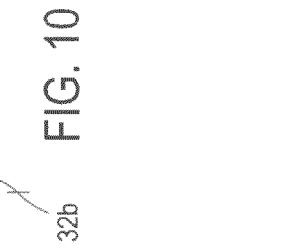
Figure 11:
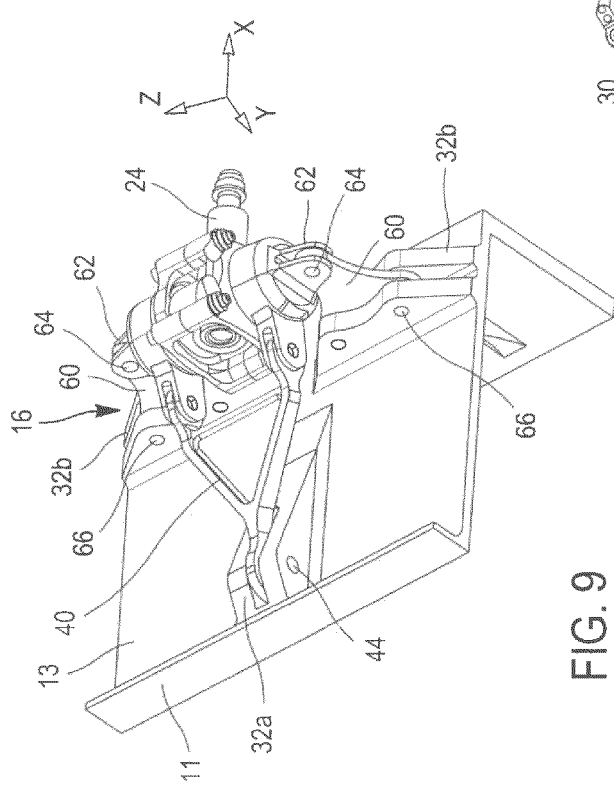

Consequently, as diagrammed in FIG. 8, the front attachment is designed such that the picking up of stresses done by the clevises is done following six degrees of freedom, since each of these three clevises covers two degrees of freedom.

FIGS. 9 to 12 illustrate the front engine attachment 16 according to a second embodiment.

This second example differs from the first in that the two second clevises 32b are double, and each receive a base of a triangular fitting 60, the apex of which opposite said base is housed in the clevis 2 made in a single piece with the housing 22.

The triangular fitting 60 is therefore hinged on the clevis 62 by a hinge member 64 oriented in direction X, and hinged in two places on the second double clevis 32b, also by two hinge members 66 oriented in direction X.

Figure 12:
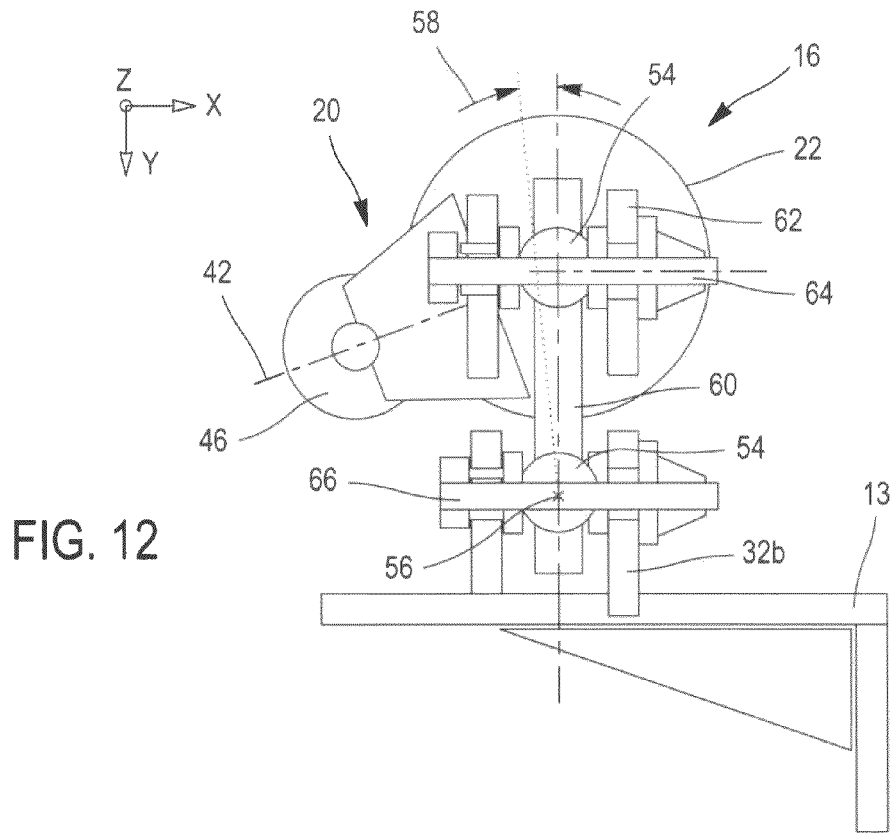

As shown in FIG. 12, each hinge member 64, 66 can be provided equipped with a ball joint 54 in order to form a swivel axis. The fitting 60 is in this case mounted on each of the three ball joints 54 so as to be able to pivot along a limited amplitude 58, along an axis 56 oriented in direction Z and passing through the center of the two ball joints 54 equipping the axes 66, in particular to face the differential expansion. Even with assembly without play, in direction X, of the ball joints in the clevises, this design makes it possible to filter the stresses in direction X, and only to pick up stresses oriented in directions Y and Z with each of the two second clevises 32b. The picking up of the stresses ensured by the three clevises is then similar to that shown in FIG. 8.

Figure 13:
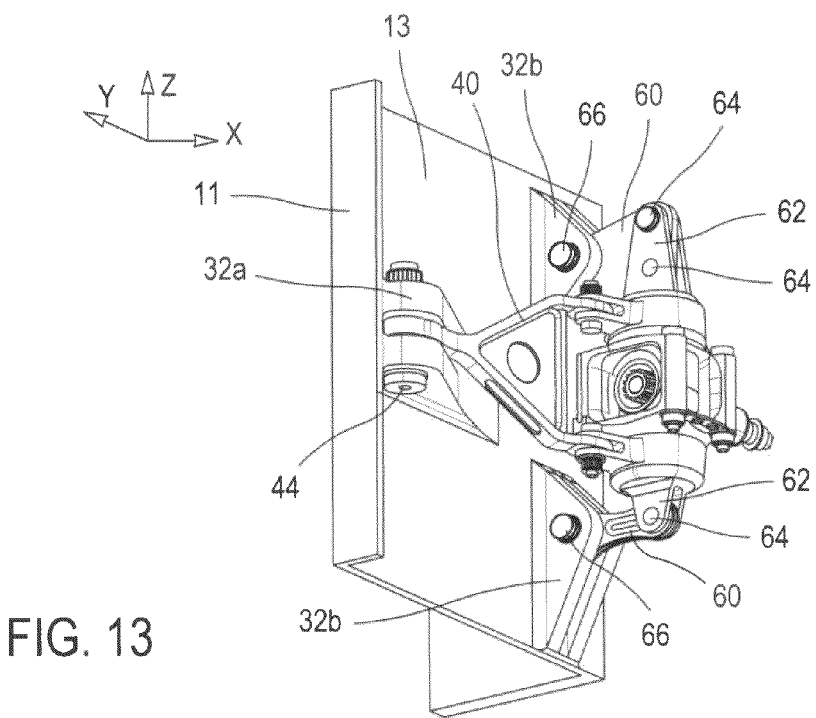
FIGS. 13 and 14 show another embodiment of a front engine attachment.
Figure 14:
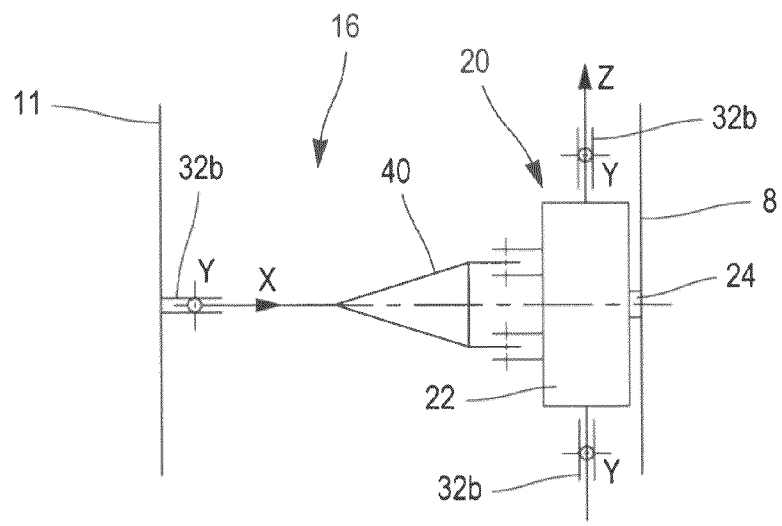

FIGS. 13 and 14 illustrate the front engine attachment according to a third embodiment.

This third example differs from the preceding one by the nature of the fittings 60 used. Associated with one of the two clevises 32b, this fitting 60 stays triangular with one of its bases mounted hinged in two places in the double clevis 62 provided, still using two suitable hinge members 64 oriented along direction X, and with the apex opposite said base housed and hinged in the clevis 32b via a hinge member 66 also oriented along direction X. Associated with the other second clevis 32b, the fitting 60 assumes the form of a connecting rod with one of its ends hingedly mounted in the clevis 62 using a suitable hinge member 64 oriented along the direction X, and with its opposite end housed and hinged in the clevis 32b via a hinge member 66 also oriented in direction X.

With this design, the clevis 32b associated with the connecting rod only picks up stresses oriented along direction Y, while the clevis associated with the triangular fitting only picks up stresses oriented along directions Y and Z.

Consequently, as diagrammed in FIG. 14, the front attachment is designed such that the picking up of stresses done by the clevises is done following five degrees of freedom.

Figure 15:
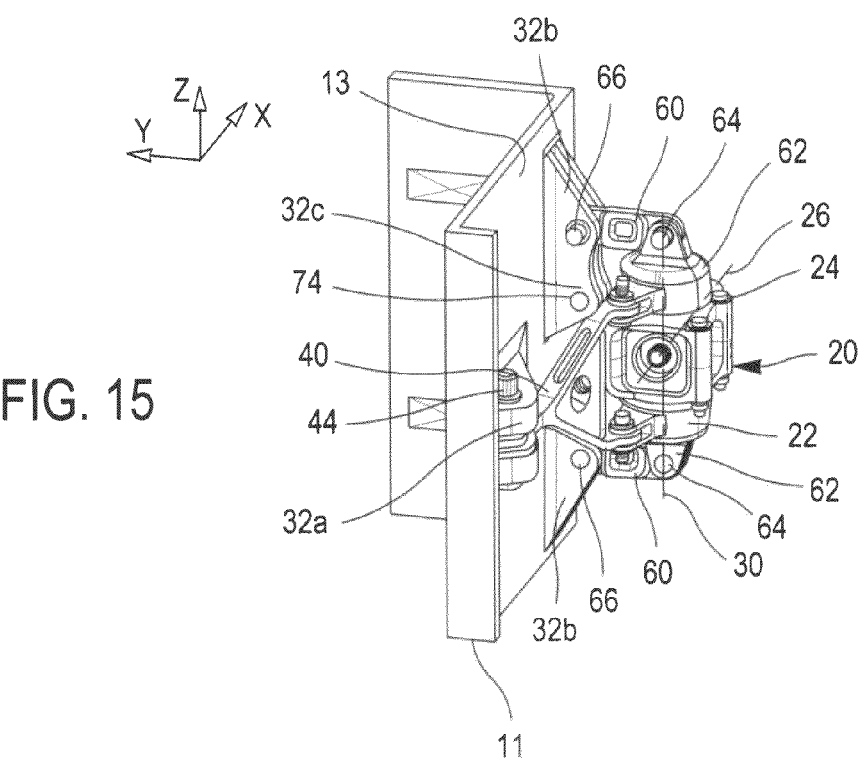
FIGS. 15 to 17 show still another embodiment of a front engine attachment.
Figure 16:
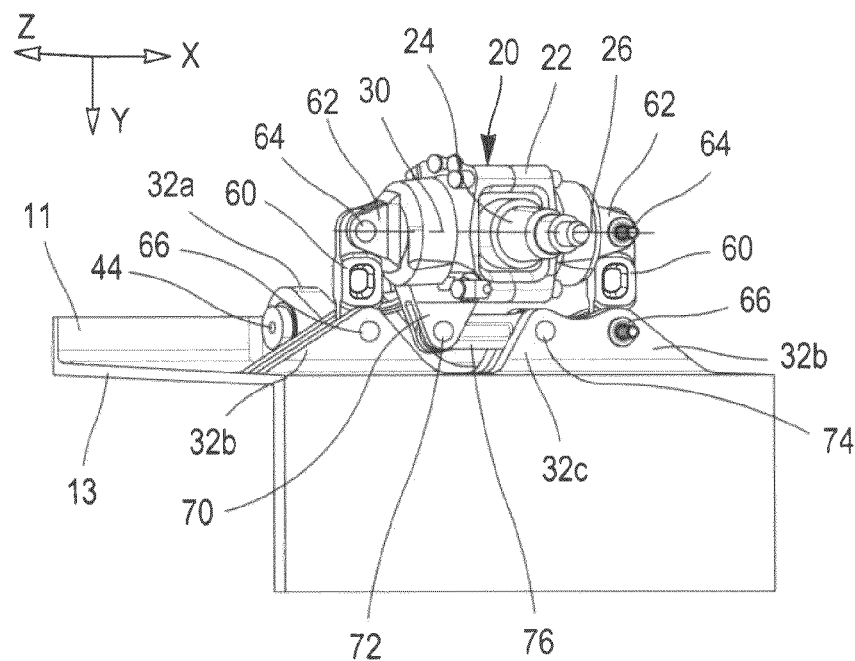
Figure 17:
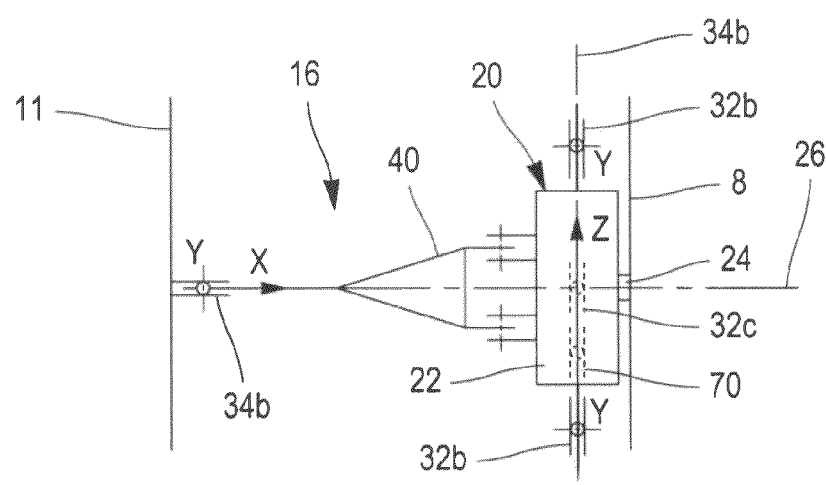

Lastly, FIGS. 15 to 17 show the front engine attachment 16 according to a fourth embodiment.

This fourth example differs from the preceding one first by the fact that the two second clevises 32b are each associated with a fitting 60 in the form of a connecting rod for connecting them to the clevises 62 provided in a single piece with the housing 22.

Moreover, a third clevis 32c is provided here arranged between the two second clevises, and between the casing 13 and the housing 22. This third clevis 32c also has the plane 34b as middle plane parallel to its clevis heads, integrating the second axis 30 and orthogonal to the first axis 26.

The fastening means associated with this third clevis includes a connecting rod 76 parallel to the second axis 30, i.e. parallel to direction Z, one of its ends being mounted hinged in a clevis 70 provided in a single piece with the housing, using a suitable hinge member 72 oriented in direction X, and with its opposite end housed and hinged in the clevis 32c via a hinge member 74 also oriented along direction X.

With this design, each second clevis 32b only picks up stresses oriented along direction Y, while the third clevis 32c only picks up stresses oriented along direction Z.

Consequently, as diagrammed in FIG. 17, the front attachment is designed such that the picking up of stresses done by the clevises occurs following five degrees of freedom.

It is indicated that in each of the examples presented above, the hinge members are preferably swiveling, as described for the members 50, 64 and 66.

Of course, various changes can be made by those skilled in the art to the invention just described, solely as non-limiting examples.

The invention claimed is:

1. An engine assembly for an aircraft, comprising:
    a turboprop provided with a propeller and a transmission driving a rotor of said propeller;
    an attachment mast of the turboprop;
    an attachment means for attaching the turboprop on said attachment mast, said means comprising a plurality of front engine attachments inserted between said attachment mast and a casing of the turboprop transmission, each front engine attachment comprising an engine vibration insulation system, a support means thereof integrated into the casing of the transmission, as well as a fastening means inserted between said support means and the vibration insulation system, the latter part including:
    a housing mounted on the support means via a fastening means;
    a stress transmitting member extending along a first axis parallel to a rotational axis of said propeller, said member comprising an outer end mounted on said attachment mast; and
    a hollow member integrated in said housing and extending along a second axis orthogonal to and intersecting said first axis, said hollow member housing an inner end of the stress transmitting member, characterized in that for each front attachment, said support means is formed by a plurality of clevises each having a middle plane parallel to a clevis head, integrating one of said first and second axes and orthogonal to the other of said axes.

2. The engine assembly according to claim 1, characterized in that said plurality of clevises includes:
    a first clevis arranged in front relative to said housing of the engine vibration insulation system, said first clevis having a middle plane parallel to a clevis head, integrating said first axis and orthogonal to the second axis; and
    two second clevises arranged respectively on either side of said housing of the engine vibration insulation system, along said second axis, the two second clevises having a same middle plane parallel to clevis heads, integrating said second axis and orthogonal to the first axis.

3. The engine assembly according to claim 2, characterized in that said fastening means includes a fork connecting said first clevis to the housing of the engine vibration insulation system, said fork extending in a plane integrating said second axis.

4. The engine assembly according to claim 2, characterized in that said first clevis extends from a front fastening clip of the transmission casing, said front fastening clip being fixedly mounted on a rear fastening clip of a stator of said propeller.

5. The engine assembly according to claim 2, characterized in that said fastening means connected with at least one of said two second clevises includes a hinge member passing through said at least one of said two second clevises, said hinge member being parallel to the first axis and also passing through a fitting housed in the clevis, formed in a single piece with the housing.

6. The engine assembly according to claim 2, characterized in that said fastening means connected with at least one of said two second clevises comprises a hinge member passing through said at least one of said two second clevises, a fitting housed in the first clevis, also passed through by said hinge member parallel to the first axis, and another hinge member parallel to the first axis, passing through the fitting and clevis provided in a single piece with the housing, in which said fitting is housed.

7. The engine assembly according to claim 6, characterized in that said fitting is triangular or assumes the form of a connecting rod.

8. The engine assembly according to claim 2, characterized in that said plurality of clevises also includes a third clevis arranged between the two second clevises, and in that said fastening means connected with said third clevis includes a hinge member passing through said third clevis, a connecting rod parallel to the second axis housed in the third clevis, also passed through by said hinge member parallel to the first axis, and another hinge member parallel to the first axis, passing through the connecting rod and a clevis provided in a single piece with the housing, in which said connecting rod is housed.

9. The engine assembly according to claim 1, characterized in that each front attachment is designed such that the picking up of stresses by said plurality of clevises is done with only six degrees of freedom, in order to preserve an isostatic system.

* * * * *